(12) United States Patent
Swanson et al.

(10) Patent No.: US 6,591,332 B1
(45) Date of Patent: Jul. 8, 2003

(54) APPARATUS AND METHOD FOR TRACKING FLUSHES OF CACHE ENTRIES IN A DATA PROCESSING SYSTEM

(75) Inventors: Jeffrey C. Swanson, Sunnyvale, CA (US); John A. Wickeraad, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/561,332

(22) Filed: Apr. 28, 2000

(51) Int. Cl.⁷ .............................................. G06F 12/00
(52) U.S. Cl. ...................... 711/108; 711/144; 711/145; 711/122
(58) Field of Search ................................. 711/135, 144, 711/141, 145, 119, 118, 121, 122, 108

(56) References Cited

U.S. PATENT DOCUMENTS

| | | | |
|---|---|---|---|
| 5,285,323 A | * | 2/1994 | Hetherington et al. ...... 345/519 |
| 5,579,504 A | * | 11/1996 | Callander et al. ........... 711/121 |
| 5,581,727 A | * | 12/1996 | Collins et al. ............... 711/122 |
| 5,802,574 A | * | 9/1998 | Atallah et al. ............... 711/118 |
| 5,913,226 A | * | 6/1999 | Sato ........................... 711/141 |
| 6,052,757 A | * | 4/2000 | Pedicone et al. ............ 711/108 |
| 6,397,296 B1 | * | 5/2002 | Werner ........................ 711/119 |

* cited by examiner

Primary Examiner—Hiep T. Nguyen
Assistant Examiner—Brian R. Peugh (57) ABSTRACT

An apparatus and method using a valid bit in a cache entry address first-in-first-out (FIFO) to indicate when a cache entry can be flushed in a coherent memory domain. One embodiment of the invention involves a method for tracking a cache entry in a cache serving data transfers between a coherent memory domain and a non-coherent memory domain in a data processing system, including steps of storing an address corresponding to a cache entry in a FIFO register, using at least one register cell as a valid flag to indicate when the cache entry is still in the cache, and changing the valid flag based on one or more signals transmitted from the non-coherent memory domain. A second embodiment of the invention involves a data processing system or an I/O bridge host, having a cache and multiple cache entries, serving data transfers between a coherent memory domain and a non-coherent memory domain, including registers configured to store an address corresponding to a cache entry, wherein each FIFO register has a valid flag to indicate when the cache entry is still in the cache, and the valid flag can be changed based on one or more signals transmitted from the non-coherent memory domain.

19 Claims, 9 Drawing Sheets

(PRIOR ART)

(PRIOR ART)

FIG. 3

(PRIOR ART)

APPARATUS AND METHOD FOR TRACKING FLUSHES OF CACHE ENTRIES IN A DATA PROCESSING SYSTEM

BACKGROUND OF THE INVENTION

1. Field of the Invention

This invention relates generally to an improvement in cache memory management, and more specifically to tracking flushes of cache entries in a cache memory bridging a coherent memory domain (e.g., a data processing system) and non-coherent memory domain (e.g., input/output (I/O) devices).

2. Description of the Prior Art

Many data processing systems (e.g., computer systems, programmable electronic systems, telecommunication switching systems, control systems, and so forth) use one or more I/O devices for data transfers. Typically, an I/O bridge host (also called a primary hub), and multiple I/O bridge guests are connected in a hierarchy to facilitate data transfers between the data processing system and the I/O devices. The I/O bridge host is connected to the I/O bridge guests, which are connected to the I/O controllers, which are connected to the I/O devices.

Figure 1:
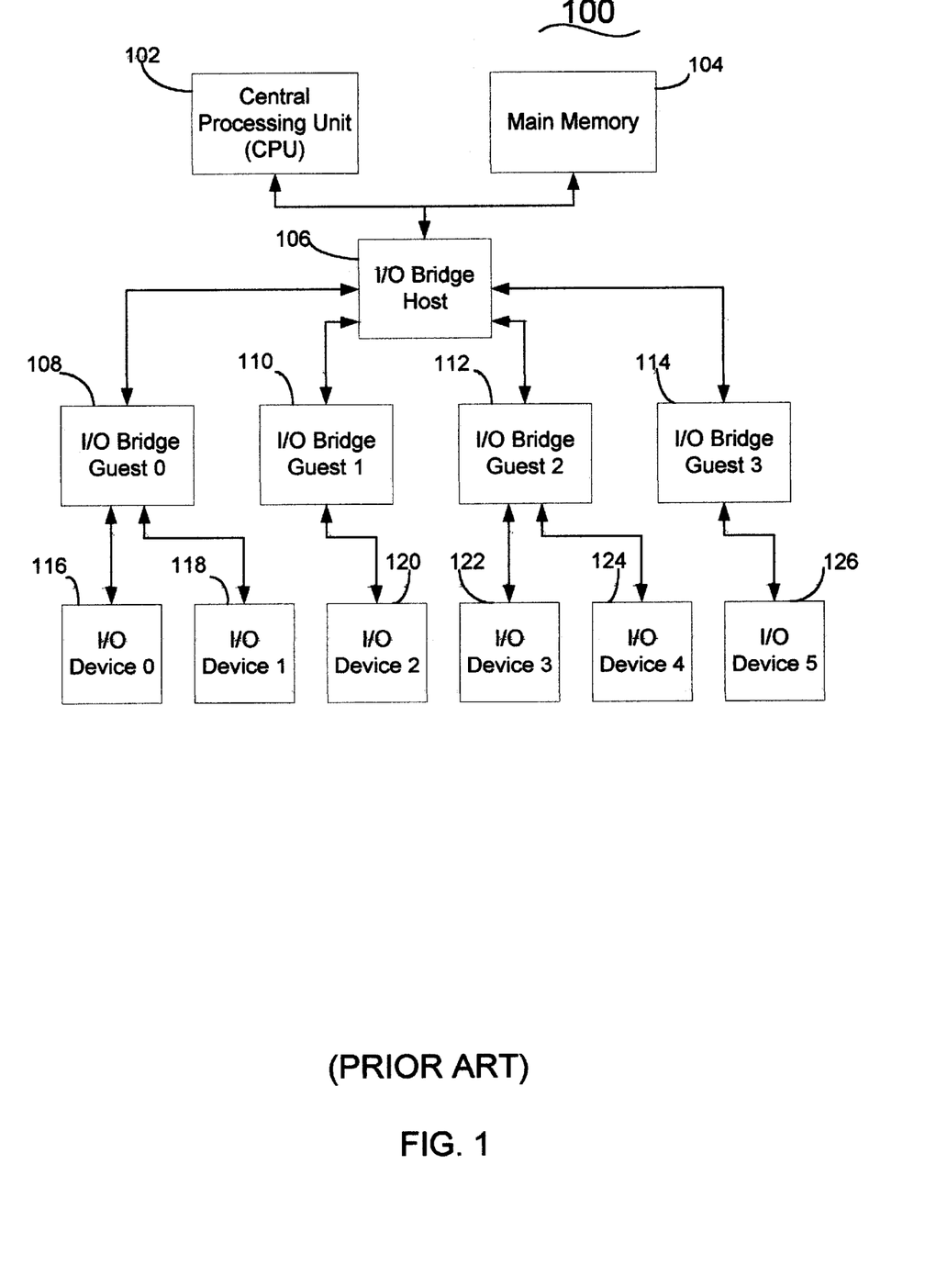
FIG. 1 shows a block diagram of a prior art data processing system.

FIG. 1 illustrates a typical prior art data processing system 100 that includes central processing unit (CPU) 102 connected by a common bus to main memory 104, and I/O bridge host 106. I/O bridge host 106 is connected to I/O bridge guests 108, 110, 112, and 114. I/O bridge guest 108 is connected to I/O devices 116 and 118. I/O bridge guest 110 is connected to I/O device 120. I/O bridge guest 112 is connected to I/O devices 122 and 124. I/O bridge guest 114 is connected to I/O device 126. The I/O controllers are not shown, but they are frequently incorporated in the I/O devices.

Many data processing systems use a cache memory (cache) in the I/O bridge host to improve the speed of communication with the I/O bridge guests (and ultimately the I/O devices). The cache management of the cache entries in the cache in the I/O bridge host is complex. One reason for this complexity is that the I/O bridge host and the cache are usually designed to be in the coherent memory domain (i.e., the location of the most up-to-date version of each cache entry is always identified), while the I/O devices are usually in the non-coherent memory domain.

One prior art solution for tracking the point in time to flush a cache entry (i.e., send data back to main memory or give up ownership of the cache entry) involves sending a cache entry address and a cache entry from the I/O bridge host to the I/O device. When the cache entry can be flushed, a message containing the cache entry address is sent back to the I/O bridge host from the I/O bridge guest. However, this prior art solution requires considerable bandwidth, and/or a large number of circuit packaging pins for communicating the cache entry address.

Figure 2:
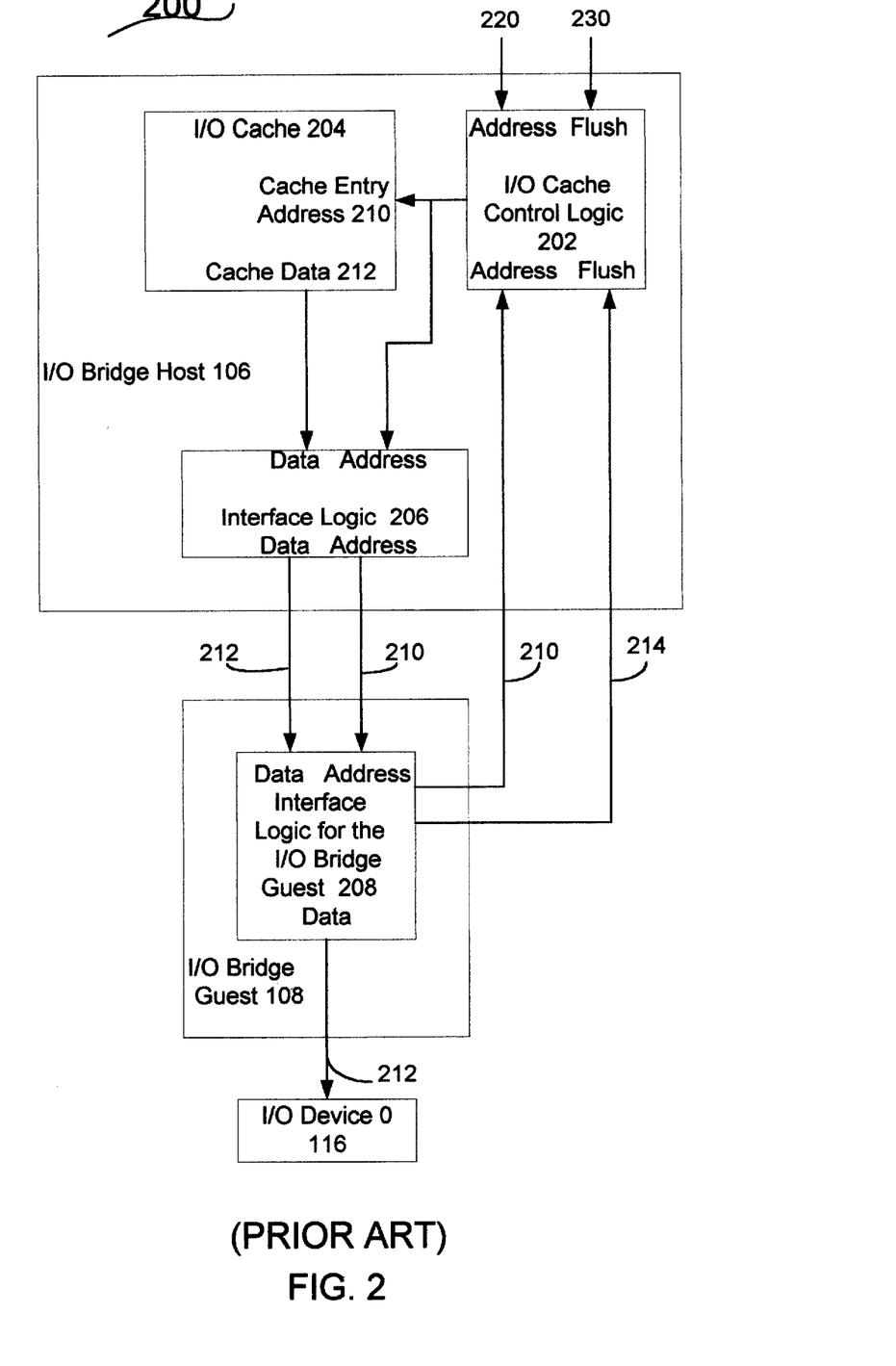
FIG. 2 illustrates such a prior art data processing system that includes an I/O bridge host that contains I/O control logic, an I/O cache, and interface logic.

FIG. 2 illustrates such a prior art data processing system 200 which includes an I/O bridge host 106 that contains I/O control logic 202, I/O cache 204, and interface logic 206. I/O cache control logic 202 receives a cache entry address 220 and a flush command 230 from memory. I/O cache control logic 202 provides a cache entry address 210 to I/O cache 204 and interface logic 206. I/O cache 204 provides cache data 212 to interface logic 206. Interface logic 206 outputs cache entry address 210 and cache data 212 to interface logic 208 for the I/O bridge guest 108. I/O bridge guest 108 outputs cache data 212 to I/O device 116, and outputs cache entry address 210 and a flush signal 214 to I/O cache control logic 202. This requires considerable bandwidth, and a large number of circuit packaging pins for communicating the cache entry address, unless the I/O bridge host and I/O bridge guest are on the same integrated circuit chip or module.

A second prior art solution for tracking the time to flush cache entries in a cache in an I/O bridge host is to store cache entry addresses in a flush-cache-entry first-in-first-out (FIFO) memory. When an I/O device reads the last byte of a cache entry, it sends a message indicating that the I/O bridge host can flush the cache entry. When an I/O device sends a message to the I/O bridge host to flush the cache entry, the cache flushes the cache entry to main memory in the data processing system. The FIFO must be large enough to accommodate the maximum number of cache entries being transferred between the data processing system and the I/O device at a given point of time.

Figure 3:
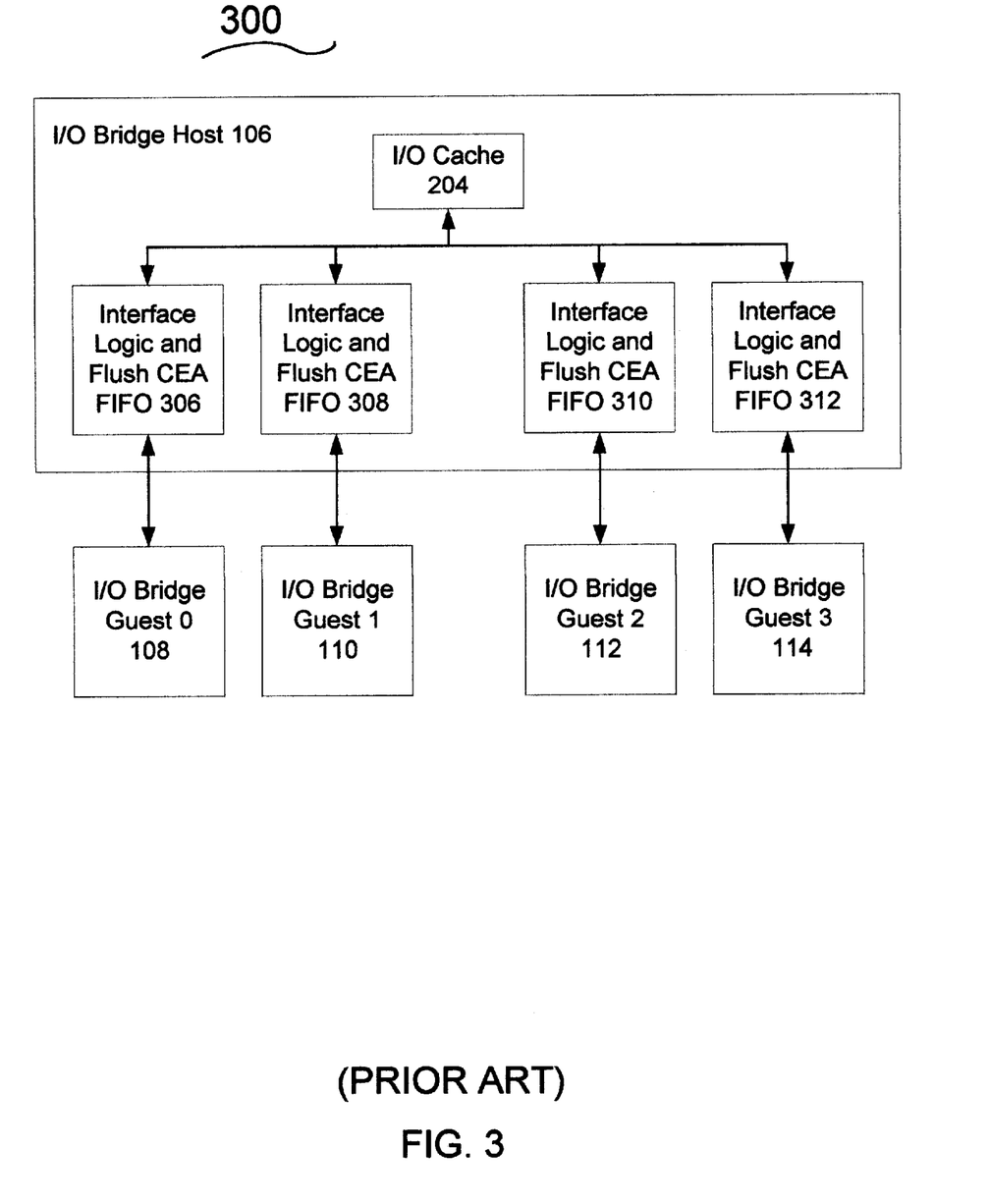
FIG. 3 illustrates one configuration of a prior art data processing system that includes an I/O bridge host containing an I/O cache, which is connected by a common bus to interface logic and flush cache-entry-address (CEA) FIFOs.

FIG. 3 illustrates one configuration of a prior art data processing system 300 that includes an I/O bridge host 106 containing I/O cache 204, which is connected by a common bus to interface logic and flush cache-entry-address (CEA) FIFOs 306, 308, 310, and 312. Flush CEA FIFO 306 is connected to I/O bridge guest 108. Flush CEA FIFO 308 is connected to I/O bridge guest 110. Flush CEA FIFO 310 is connected to 110 bridge guest 112. Flush CEA FIFO 312 is connected to I/O bridge guest 114.

Figure 4:
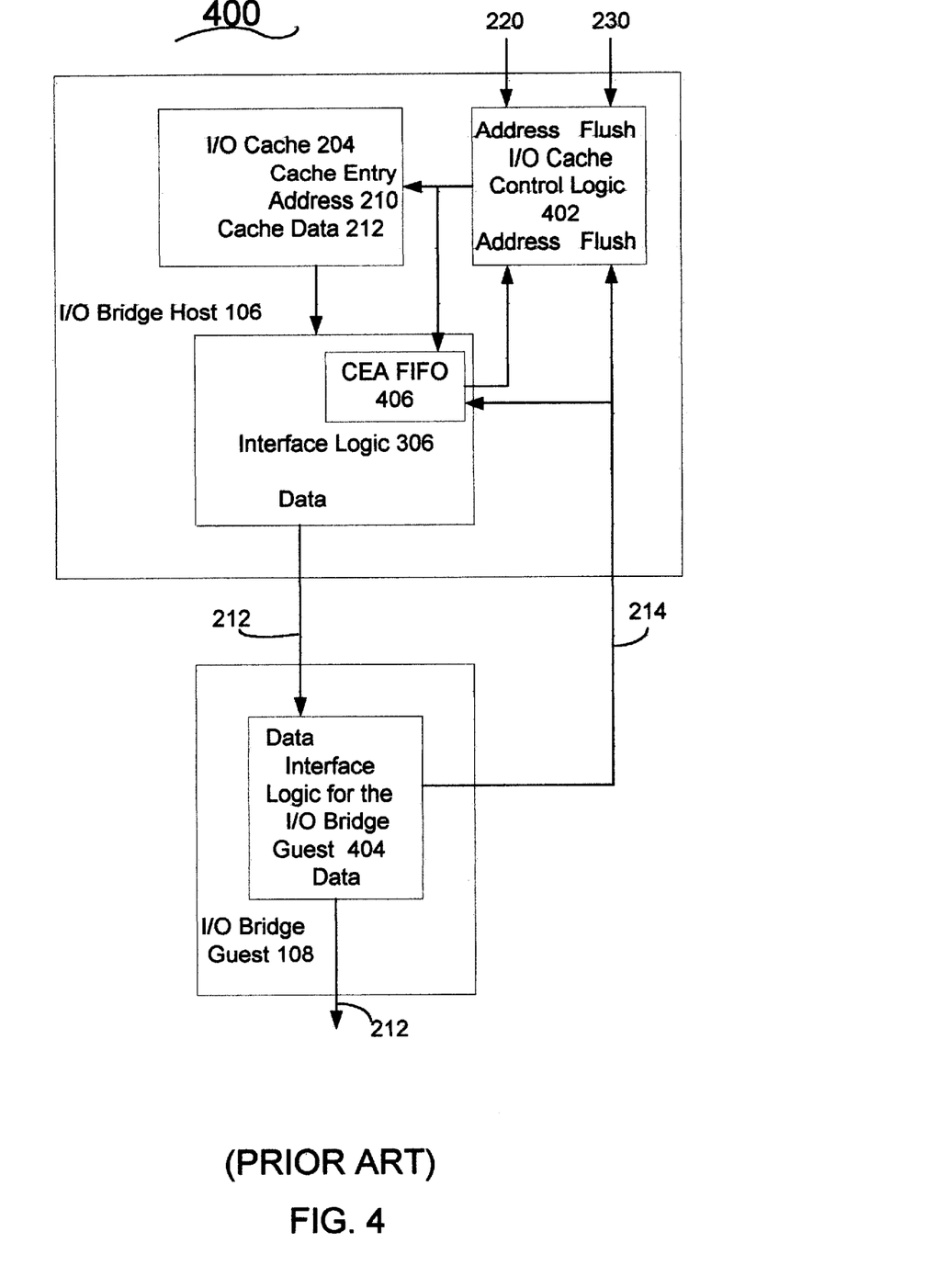
FIG. 4 illustrates a prior art data processing system in more detail that includes an I/O bridge host that contains I/O control logic, an I/O cache, and interface logic.

FIG. 4 illustrates a prior art data processing system 400 in more detail that includes an I/O bridge host 106 that contains I/O cache control logic 402, I/O cache 204, and interface logic 306. I/O cache control logic 402 receives a cache entry address 220 and a flush command 230 from memory. I/O cache control logic 402 provides a cache entry address 210 to I/O cache 204 and to Flush CEA FIFO 406 (henceforth simply referred to as CEA FIFO 406) in interface logic 306. I/O cache 204 provides cache data 212 to interface logic 306. Interface logic 306 outputs cache data 212 to interface logic 404 for the I/O bridge guest 108. Interface logic 404 outputs flush signal 214 to I/O cache control logic 402 and CEA FIFO 406. I/O bridge guest 108 outputs cache data 212 to an I/O device (not shown).

The problem with this second prior art solution is that it does not take into account the fact that the cache could be required to flush or choose to flush the cache entry for other reasons, such as during the operation of a cache snoop algorithm or a cache replacement algorithm. The cache may re-use the cache entry for some other data. When the original I/O device sends a flush message, the cache controller will flush the new data. Because the cache is part of a coherent memory domain (i.e., architecture), this behavior does not cause data corruption, but it can cause performance degradation, because the data may need to be re-fetched (e.g., from main memory) for the second request that is being serviced by the cache.

It would be desirable to prevent the flushing of a re-allocated cache entry by keeping track of the flush status of the cache entry by using the CEA FIFO, and still maintain the order of the cache entries for the I/O responses. This avoids the cache tossing out new data destined for a different I/O device than the I/O device issuing the flush, and thereby prevents performance degradation caused by additional flush and re-request transactions for the cache.

SUMMARY OF THE INVENTION

An object of the invention is to prevent the flushing of a re-allocated cache entry by keeping track of the flush status of the cache entry by using the CEA FIFO, and still maintain the order of the cache entries for the I/O responses.

A first aspect of the invention is directed to a method for tracking at least one cache entry in a cache serving data transfers between a coherent memory domain and a non-coherent memory domain in a data processing system, including steps of storing an address corresponding to at least one cache entry in a plurality of memory cells, using at least one memory cell as a valid flag to indicate when at least one cache entry is still in the cache, and changing the valid flag based on one or more signals transmitted from the non-coherent memory domain.

A second aspect of the invention is directed to a data processing system or an I/O bridge host, having a cache and at least one cache entry, serving data transfers between a coherent memory domain and a non-coherent memory domain, including a plurality of memory cells, wherein the plurality of memory cells are configured to store an address corresponding to the cache entry, at least one memory cell, wherein the memory cell is configured as a valid flag to indicate when the cache entry is still in the cache, and the valid flag can be changed based on one or more signals transmitted from the non-coherent memory domain.

These and other objects and advantages of the invention will become apparent to those skilled in the art from the following detailed description of the invention and the accompanying drawings.

DETAILED DESCRIPTION OF PREFERRED EMBODIMENTS OF THE INVENTION

This invention provides an apparatus and method to prevent the flushing of a re-allocated cache entry by keeping track of the flush status of the cache entry in the flush-cache-entry (CEA) FIFO, and still maintain the order of the cache entries for the I/O responses.

In one preferred embodiment of the invention, there is a flush CEA FIFO that stores cache address entries, and which includes a settable and clearable bit called "cache_entry_valid" for each entry that indicates if that cache entry has been flushed, or if that cache entry is still in the cache. Additionally, in the preferred embodiment there is a content-addressable-memory (CAM) FIFO to search for matches of cache entry addresses in the flush CEA FIFO. Whenever the cache is about to flush a cache entry, the cache entry address is sent over to this CAM FIFO, which simultaneously searches in all entries of the flush CEA FIFO to invalidate (and clear) the bit "cache_entry_valid" for all cache entries that match the cache entry to be flushed. Then when an I/O device responds with a message requesting that the cache entry be flushed, the response is gated (logically ANDed) with the "cache_entry_valid" bit at the head of the flush CEA FIFO to determine if the cache entry should be flushed. In either case, the flush CEA FIFO entry at the top is popped (removed), and the flush CEA FIFO waits for the next message from the I/O device.

In a preferred embodiment of the invention, there is a flush CEA FIFO for I/O cache management of a cache for an I/O device, with or without an I/O bridge host or with or without an I/O bridge guest. In alternative preferred embodiments of the invention, any number of I/O devices transferring data to and from one or more caches can be supported by a separate flush CEA FIFO for each I/O device. Alternative embodiments of the invention could use a larger or smaller number of bits for tracking multiple I/O devices in one or more FIFOs. Alternative embodiments can use other memory configurations besides a FIFO configuration, such as individual registers having an assigned precedence for data access. Additionally, alternative embodiments can use equivalent logic circuits for FIFO comparisons to achieve a CAM FIFO operation. Since each I/O device typically has an assigned CEA FIFO for I/O cache management of a cache in the I/O bridge host, one CEA FIFO in the I/O bridge host will be described.

Figure 5:
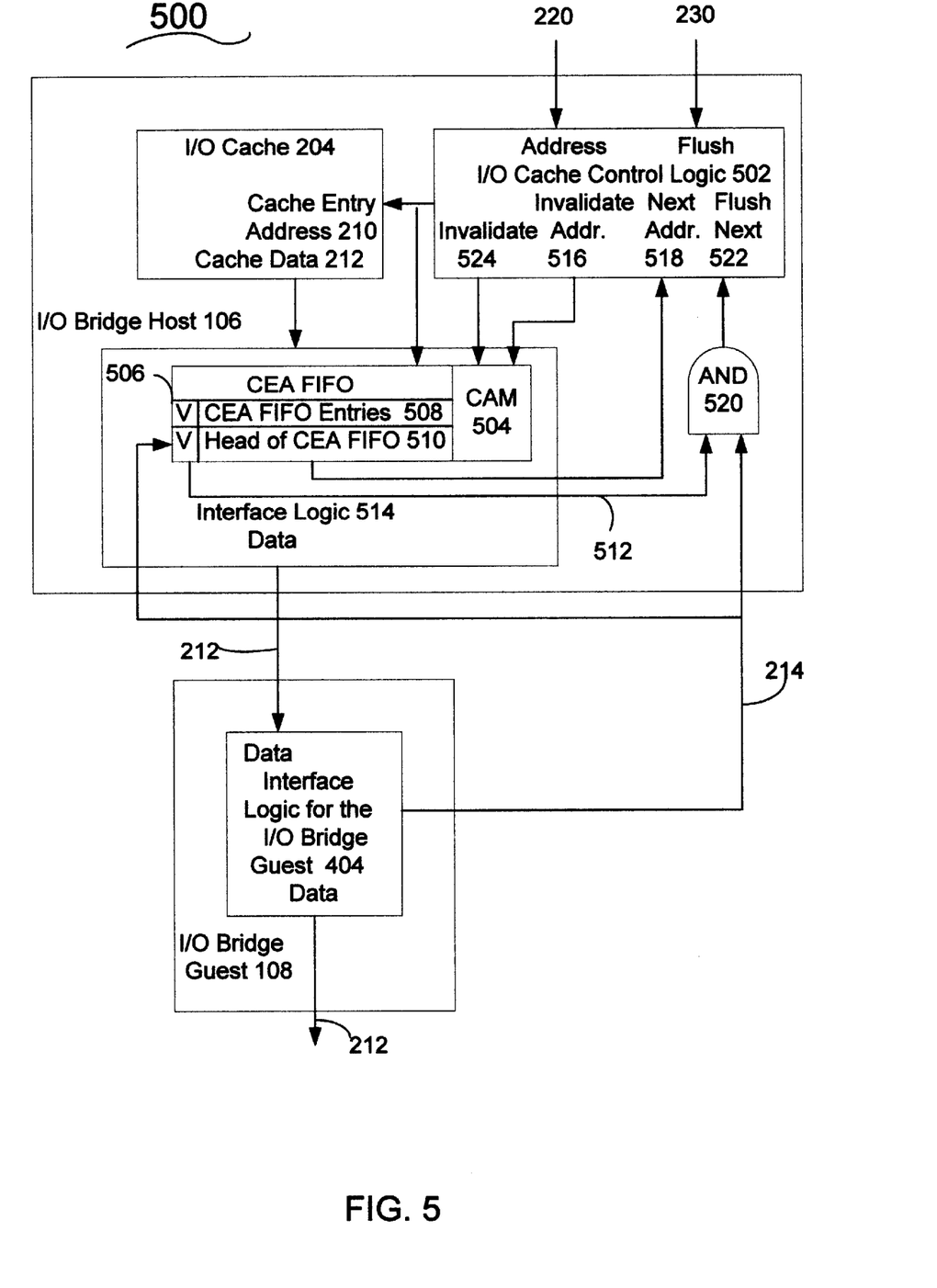
FIG. 5 illustrates one preferred embodiment of the invention implemented in a data processing system.

FIG. 5 illustrates one preferred embodiment of the invention implemented in a data processing system 500. Data processing system 500 includes I/O bridge host 106 that contains I/O cache control logic 502, I/O cache 204, and interface logic 514. Interface logic 514 contains CAM 504 and CEA FIFO 506. CEA FIFO contains CEA FIFO entries 508 and head of CEA FIFO 510, each entry also containing a valid bit V. I/O cache control logic 502 receives a cache entry address 220 and a flush command 230 from memory. I/O cache control logic 502 outputs a control signal labeled "invalidate" 524 and a CEA FIFO address called "invalidate_CEA_next" 516 to CAM 504. I/O cache control logic 502 provides a cache entry address 210 to I/O cache 204 and to CEA FIFO 506 in interface logic 514. I/O cache 204 provides cache data 212 to interface logic 514. Interface logic 514 outputs cache data 212 to interface logic 404 for the I/O bridge guest 108. Interface logic 404 outputs flush signal 214 to the head of CEA FIFO 510 and logical AND gate 520, which also receives input 512 from the valid bit at the head of CEA FIFO 510. Logical AND gate 520 produces an output signal "do_flush_next" 522 that is received by I/O cache control logic 502. I/O bridge guest 108 outputs cache data 212 to an I/O device (not shown). The memory cells of any component of I/O bridge host 106 can be implemented with flip-flops, latches, random access memory, or programmable memory, such as flash memory, or any other memory element.

Figure 6:
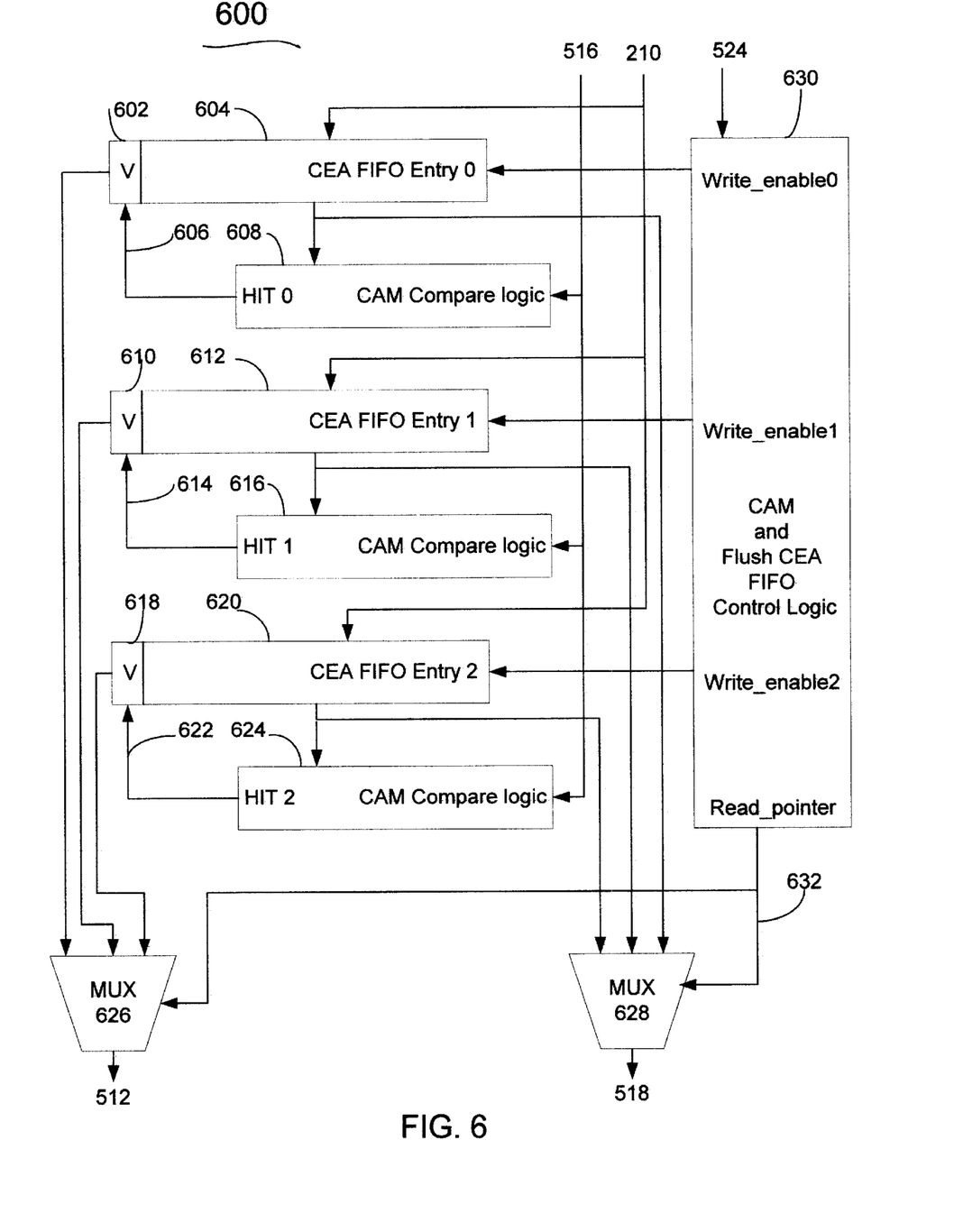
FIG. 6 illustrates a more detailed view of one preferred embodiment of the invention, including the CAM and Flush CEA FIFO control logic, CEA FIFO entries, CAM compare logic, and multiplexers.

FIG. 6 illustrates a more detailed view 600 of one preferred embodiment of the invention, including the CAM and Flush CEA FIFO control logic 630, CEA FIFO entries 604, 612, and 620, CAM compare logic 608, 616, and 624, and multiplexers 626 and 628. CEA FIFO entries 604, 612, and 620 also contain valid bits 602, 610 and 618, respectively. Also shown are CAM and Flush CEA FIFO control logic 630, and multiplexers MUX 626 and MUX 628. "Read_pointer" 632 selects which valid bit and CEA FIFO entry are output from multiplexers MUX 626 and MUX 628 as the "valid" signal and "flush_CEA_next" address signals, respectively. CAM and Flush CEA FIFO control logic 630 receives an "invalidate" command signal 524, and at an appropriate time outputs "write_enable" signals to CEA FIFO entries 604, 612, and 620, when one of these CEA FIFO entries is to be loaded with a cache entry address 210. CAM compare logic 608, 616, and 624 receive the "invalidate_CEA_next" address 516 for comparison searches of the CEA FIFO entries 604, 612, and 620, respectively. When a comparison successfully matches the address of 516 to a CEA FIFO entry 604, 612, or 620, one or more of the hit signals 606, 614, or 622 clears the valid bit 602, 610, or 618, respectively. Multiple identical entries in the flush CEA FIFO are possible, therefore all entries should be checked and the valid bit should be cleared for each identical CEA FIFO entry.

Figure 7:
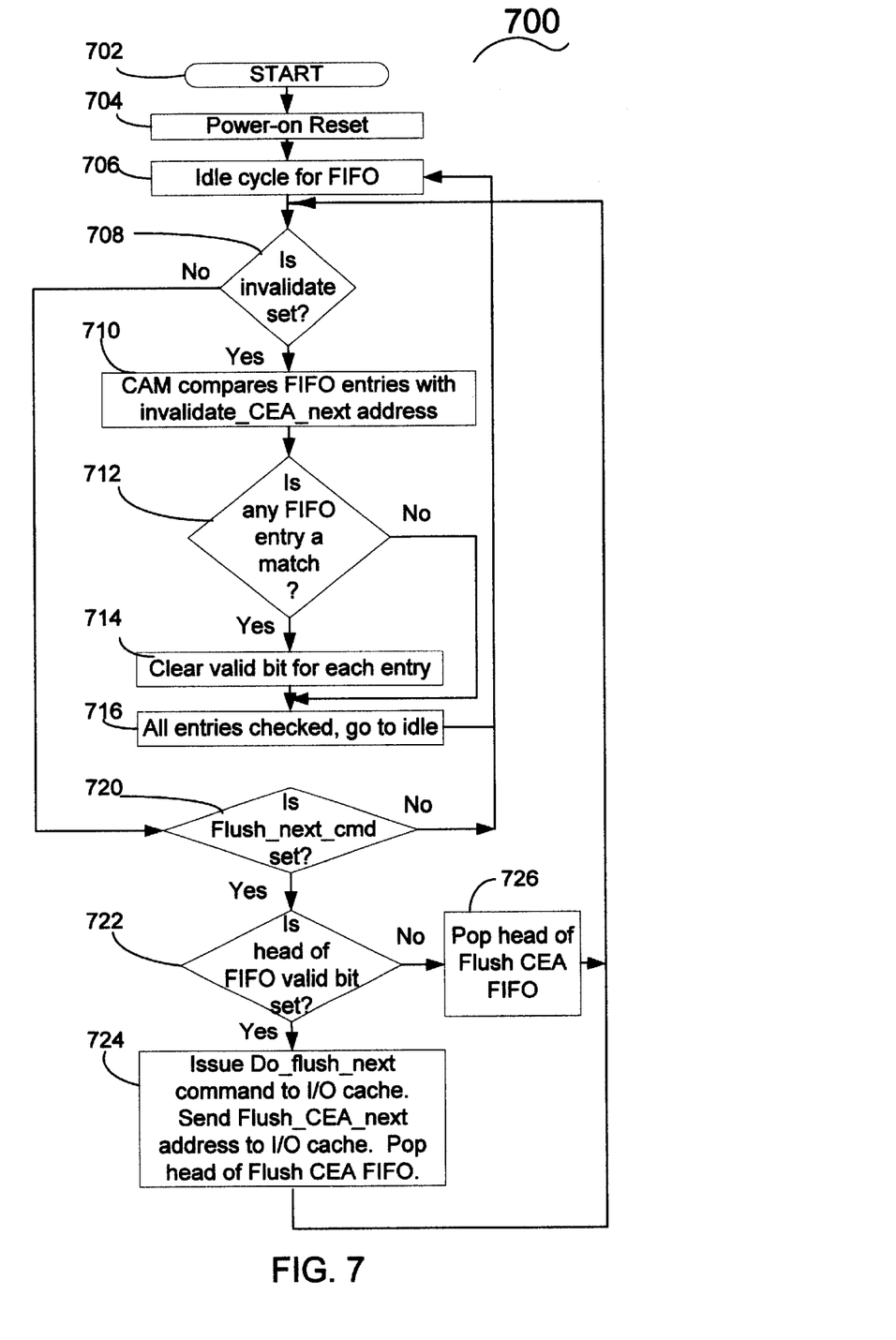
FIG. 7 illustrates a flow chart of a method for using a modified CEA FIFO with a CAM in an I/O bridge host in accordance with one embodiment of the present invention.

FIG. 7 illustrates a flow chart 700 of a method for using a modified CEA FIFO with a CAM in an I/O bridge host in accordance with one embodiment of the present invention. The method starts in operation 702. In operation 704, the data processing system undergoes a power-on reset. In operation 706, after the power-on reset is over, the CEA FIFO in the I/O bridge host waits for an idle cycle signaled by appropriate circuitry and software. In operation 708, a test is made to determine if the "invalidate" command is set by the I/O cache control logic. If the "invalidate" command is set, then operation 710 is next, where the CAM compares the CEA FIFO entries with the "invalidate_CEA_next" address provided by the I/O cache control logic. Operation 710 is then followed by operation 712, which determines in parallel if any CEA FIFO entry is a match to the "invalidate_CEA_next" address. If so, then in operation 714 the valid bit is cleared for each matching entry. If not, then operation 716 is next when all entries have been checked, and then the idle cycle in operation 706 is repeated. If the "invalidate" command is not found in the test of operation 708, then operation 720 is performed. In operation 720, a test is made to determine if the I/O bridge guest sent the "flush_next_command" to the I/O bridge host. If not, then operation 706 is next. If so, then operation 722 is next. In operation 722, a test is made to determine if the valid bit of the head of CEA FIFO is set. If the valid bit is not set, then operation 726 is next, where the head of the CEA FIFO is popped, and operation 708 is next. If the valid bit is set, then operation 724 is next. In operation 724 the "do_flush_next" command and the "flush_CEA_next" address are sent to the I/O cache control logic to actually flush the entry from the I/O cache, and the head of the CEA FIFO is popped. Then operation 708 is repeated to test for the "invalidate" command from the I/O cache control logic (on "flush_CEA_next" command, it is guaranteed to receive the "invalidate" command on the next cycle, and the CAM and Flush CEA FIFO control logic may need to respond to this immediately).

Figure 8:
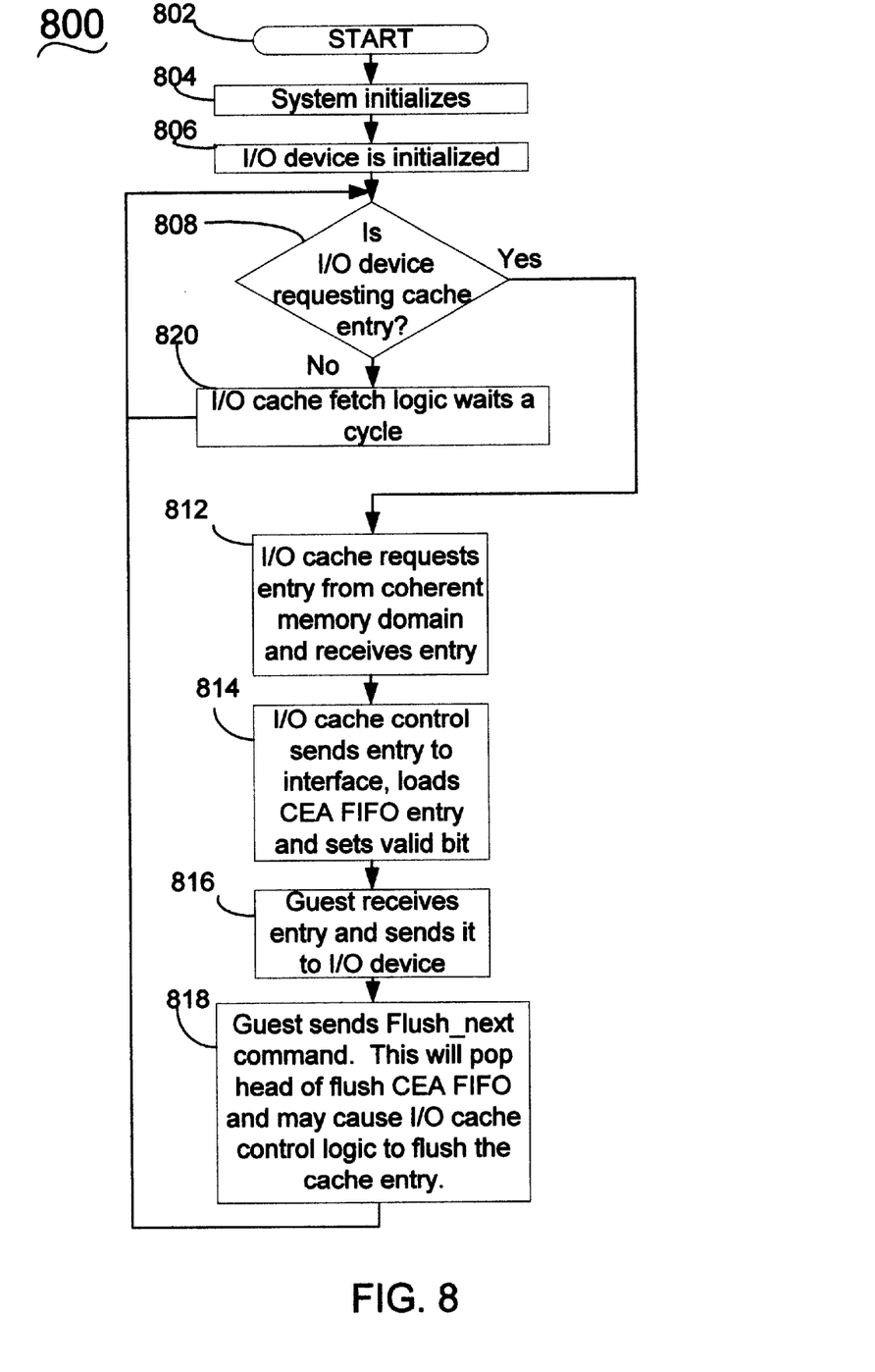
FIG. 8 illustrates a flow chart of a method for an I/O device to request and receive a cache entry in accordance with one embodiment of the present invention.

FIG. 8 illustrates a flow chart of a method for an I/O device to request and receive a cache entry in accordance with one embodiment of the present invention. The method starts in operation 802. In operation 804, the data processing system initializes. In operation 806, an I/O device is initialized and starts to communicate with an I/O bridge guest. In operation 808, a test is performed to determine if the I/O device is requesting an I/O cache entry. If the I/O device is not requesting an I/O cache entry, operation 820 is next, where the I/O cache fetch logic waits a clock cycle, then repeats operation 808. If the I/O device is requesting an I/O cache entry, operation 812 is next, where the I/O cache requests the entry from the coherent memory domain inside the I/O bridge host and ultimately receives the I/O cache entry. Operation 814 is next, where the I/O cache control logic sends the I/O cache entry data to the interface, and the I/O cache entry address is loaded in the CEA FIFO and the valid bit is set. Operation 816 is next, where the I/O bridge guest receives the I/O cache entry and sends it to the I/O device. Then operation 818 is next, where the I/O bridge guest sends the "flush_next" command to the I/O cache control logic. This will pop the head of the CEA FIFO and may cause the I/O cache control logic to flush the I/O cache entry. Then operation 808 is repeated, where the test is performed to determine if the I/O device is requesting an I/O cache entry.

Figure 9:
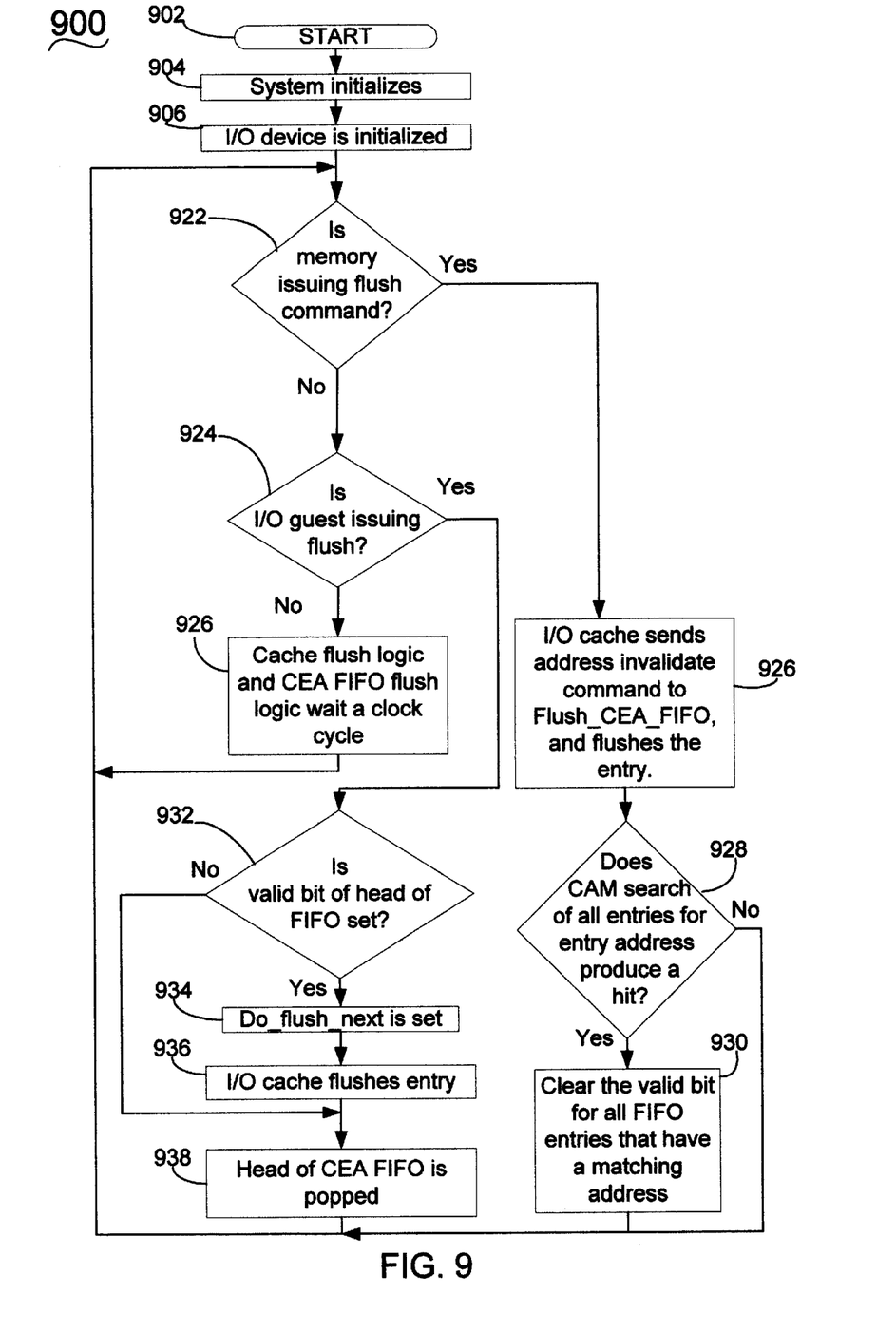
FIG. 9 illustrates a more detailed flow chart of the method illustrated in FIG. 7 in accordance with one embodiment of the present invention.

FIG. 9 illustrates a more detailed flow chart of the method illustrated in FIG. 7 in accordance with one embodiment of the present invention. The method starts in operation 902. In operation 904, the data processing system initializes. In operation 906, an I/O device is initialized and starts to communicate with an I/O bridge guest. Then operation 922 is next, where a test is performed to determine if there is any memory "flush" command issued. If a memory "flush" command has not been issued, then operation 924 is next, where a test is performed to determine if an I/O guest "flush" command is issued. If no I/O guest "flush" command has been issued, then the cache flush logic and the CEA FIFO flush logic wait a clock cycle and operation 922 is next. If an I/O guest "flush" command has been issued, then operation 932 is next, where a test is performed to determine if the valid bit of the head of the CEA FIFO is set. If not, then operation 938 is next, where the head of the CEA FIFO is popped and then operation 922 is repeated. If the valid bit of the head of CEA FIFO is set, then operation 934 is next, where the "do_flush_next" command is set. Then operation 936 is next, where the I/O cache flushes the I/O cache entry. Then operation 938 is next, where the head of the CEA FIFO is popped and then operation 922 is repeated.

If the test of operation 922 determines that a memory "flush" command is issued, then operation 926 is next. In operation 926, the I/O cache sends the "invalidate" command and the "invalidate_CEA_next" address to the CEA FIFO, and the I/O cache flushes the cache entry. Then operation 928 is next, where a test is performed to determine if the CAM search of the CEA FIFO found any matching entries (i.e., a hit). If not, then operation 922 is next. If a match occurred, then operation 930 is next, where the valid bit of all matching CEA FIFO entries are cleared. Then operation 922 is next.

The most preferred embodiment of the invention uses registers to implement the CEA FIFO. However, alternative embodiments of the invention could use other types of volatile or non-volatile memory cells (e.g., discrete flip-flops, discrete latches, random access memory, magnetic memory, or programmable memory, such as flash memory) to implement all or part of the CEA FIFO.

The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A method for tracking at least one cache entry in a cache serving data transfers between a coherent memory domain and a non-coherent memory domain in a data processing system, comprising steps of:

storing an address corresponding to said at least one cache entry in a plurality of memory cells;

using at least one memory cell as a valid flag to indicate when said at least one cache entry is still in said cache; and changing said valid flag baser on one or more signals transmitted from said non-coherent memory domain wherein said step of storing an address corresponding to said at least one cache entry in a plurality of memory cells includes storing said address in a content-addressable-memory (CAM) FIFO.

2. The method of claim 1, wherein said step of storing an address corresponding to said at least one cache entry in a plurality of memory cells includes storing said address in a first-in-first-out (FIFO) memory with comparison logic.

3. The method of claim 1, wherein said step of storing an address corresponding to said at least one cache entry in a plurality of memory cells includes storing said address in a CAM FIFO, wherein said CAM FIFO can search for said address and change said valid flag in said CAM FIFO.

4. The method of claim 1, wherein said non-coherent memory domain includes an I/O device.

5. The method of claim 1, wherein said coherent memory domain includes an I/O bridge host.

6. The method of claim 1, wherein said step of changing said valid flag based on one or more signals transmitted from said non-coherent memory domain includes logically gating said valid flag with said one or more signals transmitted from said non-coherent memory domain.

7. The method of claim 1, wherein said step of changing said valid flag based on one or more signals transmitted from said non-coherent memory domain includes logically gating said valid flag with said one or more signals transmitted from said non-coherent memory domain to flush said at least one cache entry in said cache.

8. A data processing system, having a cache and at least one cache entry, serving data transfers between a coherent memory domain and a non-coherent memory domain in said data processing system, comprising:

a plurality of memory cells, wherein said plurality of memory cells are configured to store an address corresponding to said at least one cache entry;

at least one memory cell, wherein said at least one memory cell is configured as a valid flag to indicate when said at least one cache entry is still in said cache, and said valid flag can be changed based on one or more signals transmitted from said non-coherent memory domain, wherein said plurality of memory cells further comprise a CAM FIFO for storing said address corresponding to said at least one cache entry.

9. The data processing system of claim 8, wherein said plurality of memory cells and said at least one memory cell further comprise a FIFO memory for storing said address corresponding to said at least one cache entry.

10. The data processing system of claim 8, wherein said plurality of memory cells and said at least one memory cell further comprise a CAM FIFO, wherein said CAM FIFO can search for said address and change said valid flag in said CAM FIFO.

11. The data processing system of claim 8, wherein said non-coherent memory domain includes an I/O device.

12. The data processing system of claim 8, wherein said coherent memory domain includes an I/O bridge host.

13. The data processing system of claim 8, further comprising a combinational logic circuit to logically gate said valid flag with said one or more signals transmitted from said non-coherent memory domain, wherein said valid flag can be changed based on said one or more signals transmitted from said non-coherent memory domain.

14. The data processing system of claim 8, further comprising a combinational logic circuit to logically gate said valid flag with said one or more signals transmitted from said non-coherent memory domain to flush said at least one cache entry in said cache.

15. An I/O bridge host to transfer data between an I/O device and a data processing system, said I/O bridge host comprising:

a cache configured for at least one cache entry;

a plurality of memory cells, wherein said plurality of memory cells are configured to store an address corresponding to said at least one cache entry;

at least one memory cell, wherein said at least one memory cell is configured as a valid flag to indicate when said at least one cache entry is still in said cache, and said valid flag can be changed based on one or more signals transmitted from said I/O device, wherein said plurality of memory cells further comprises a CAM FIFO for storing said address corresponding to said at least one cache entry.

16. An I/O bridge host of claim 15, wherein said plurality of memory cells and said at least one memory cell further comprise a FIFO memory for storing said address corresponding to said at least one cache entry.

17. An I/O bridge host of claim 15, wherein said plurality of memory cells and said at least one memory cell further comprise a CAM FIFO, wherein said CAM FIFO can search for said address and change said valid flag in said CAM FIFO.

18. The I/O bridge host of claim 15, further comprising a combinational logic circuit to logically gate said valid flag with said one or more signals transmitted from said I/O device, wherein said valid flag can be changed based on said one or more signals transmitted from said I/O device.

19. The I/O bridge host of claim 15, further comprising a combinational logic circuit to logically gate said valid flag with said one or more signals transmitted from said I/O device to flush said at least one cache entry in said cache.

* * * * *